United States Patent

[11] 3,590,868

| [72] | Inventor | Enrico Pontiggia<br>Milan, Italy |
|---|---|---|
| [21] | Appl. No. | 784,579 |
| [22] | Filed | Dec. 18, 1968 |
| [45] | Patented | July 6, 1971 |
| [73] | Assignee | Breda Termomeccanica & Locomotive S.p.A.,<br>Milan, Italy |
| [32] | Priority | June 28, 1968 |
| [33] | | Italy |
| [31] | | 18377A/68 |

[54] CONTROL APPARATUS FOR CONNECTING AND DISCONNECTING ONE OF A PLURALITY OF FUEL OIL BURNERS
6 Claims, 7 Drawing Figs.

[52] U.S. Cl. ........................................... 137/609
[51] Int. Cl. .................................... F16k 31/163
[50] Field of Search ................................. 137/609, 595, 601

[56] References Cited
UNITED STATES PATENTS

| 2,959,182 | 11/1960 | Ando et al. | 137/609 X |
| 2,988,883 | 6/1961 | Corbett | 137/609 X |
| 2,992,631 | 7/1961 | Fallows, Jr. | 137/609 X |

Primary Examiner—William R. Cline
Attorney—Burns, Doane, Swecker & Mathis

ABSTRACT: A control apparatus for connecting and disconnecting one of a plurality of fuel oil burners comprising: a plurality of simple seating plug valves A, B, C, G connected respectively in the oil delivery, oil return, and recirculating pipes and in the cooling and scavenging fluid delivery pipe, wherein the fluid pressure cooperates, when the valves are closed, in exerting the sealing pressure on the valve seating. A pneumatic or hydraulic servomotor operated by a single pilot slide valve simultaneously controls all the valves, including valve means provided to intercept the scavenging and cooling fluid of the burner, through lever systems.

CONTROL APPARATUS FOR CONNECTING AND DISCONNECTING ONE OF A PLURALITY OF FUEL OIL BURNERS

The present invention relates to a control apparatus for connecting and disconnecting one of a plurality of fuel oil burners.

Prior to giving a detailed description of two embodiments for the apparatus according to the present invention and for a better understanding of such an apparatus, some outline will be hereinafter disclosed about the system said apparatus is intended to be connected to, as well as to known apparatus.

THE DRAWINGS

Therefore, in the various FIGS. the accompanying drawings show:

BACKGROUND OF THE INVENTION

Figure 1:
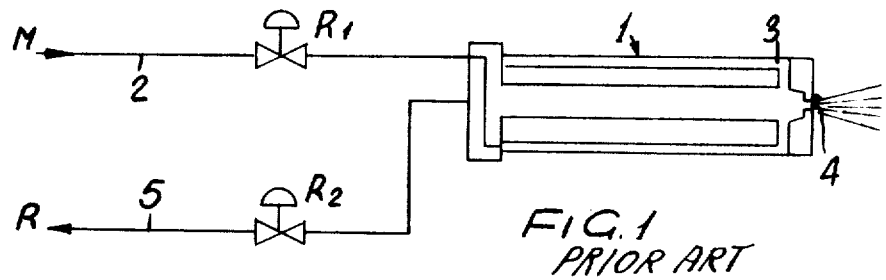
FIG. 1 is an operating diagram for a mechanical return atomization type of fuel oil burner.

First referring to FIG. 1, the operating diagram is therein shown, as above stated, for a mechanical return atomization type of fuel oil burner. It is just for intercepting this type of burners that the control apparatus according to the present invention has been designed.

Referring to said FIG. 1, it will be seen that the oil flows to burner 1 from constant delivery pipe 2, then caused to spin by passing through swirl channels 3 and appears under swirling conditions in front of the outflow nozzle 4.

The oil capacity outflowing from nozzle 4 is a function of the absolute pressure in the burner, which is varied in accordance with fire requirements in the combustion chamber by suitably positioning valves $R_1$ and $R_2$ connected on delivery and return pipes 1 and 5, respectively, or by other systems. In burners of this type the oil delivery capacity is held constant and therefore the following relation is valid:

Delivered oil = burnt oil + returned oil.

Figure 2:
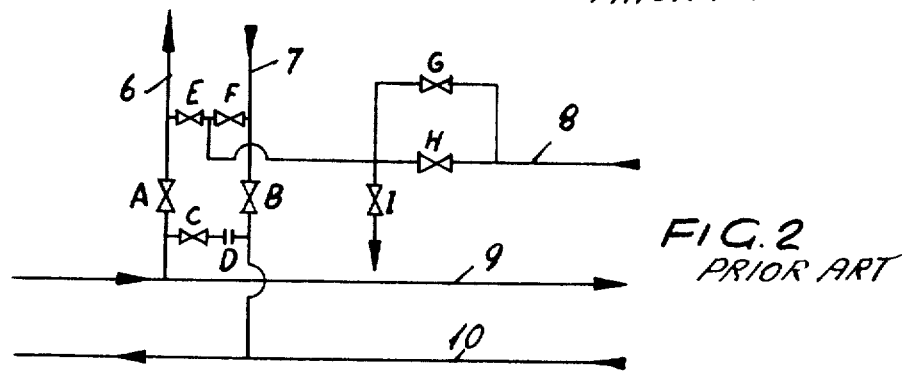
FIG. 2 is a diagram for a known apparatus.

In the systems provided with more than one burner, wherein such burners can be connected or disconnected according to load requirements, the intercepting members for connection and disconnection should be so made as not to alter the total capacity of delivered oil independently of the number of running burners. To this end, the system is normally provided with a set of members, as shown in FIG. 2.

In this figure, the various numerals designate as follows: 6 the oil delivery pipe to the individual burner being involved; 7 the return pipe from the burner; 8 the scavenging steam pipe; 9 and 10 the oil delivery and return pipes, respectively, to and from the other burners.

Burner connection is carried out by opening valves A and B and closing valve C, while disconnection is carried out through reversed operation; throttle orifice D is for providing a load loss between delivery and return sides corresponding to the pressure differential between such delivery and return sides; thus, the incoming capacity will be constant either when the burner is lit or when extinguished.

In the systems being involved, as generally provided with remote control means for burner connection and disconnection, the out-of-use burner faces the combustion chamber, although being slightly retracted therefrom. This would require:

to scavenge the burner by ejecting the oil between valves A and B and burner head;

to keep the burner, when inoperative, at a cooled condition.

This is accomplished by a low-pressure high-temperature fluid, generally such as steam; therefore, reference will be made hereinafter to steam.

To this end, valves E, F, G, H are provided. Following burner extinction, valves E and F are opened and steam is supplied through valves G and H; on burner-scavenging completion, valve H may be closed and cooling will be assured by the reduced capacity outflowing through valve G only.

Since oil pressure in the burner is generally of a high rate (20—70 Kg./sq. cm.) and pressure of scavenging and cleaning steam is much lower (10—12 Kg./sq. cm.), provisions must be taken against any oil contaminations of the steam system, as due to any leakages in valves E and F. To this end, an atmosphere exhaust valve I is provided, said valve allowing the control and free drainage, if any, for the possible oil leakages from valves E and F, without any contamination risk for the steam network upstream valves G and H.

It has been found in modern systems that the above set of operations should be effected by servocontrols. The simplest approach to this problem is to motorize or power the eight valves are as shown in FIG. 2 and to operate the same according to requirements. However, a more accurate consideration of the unit operating conditions would lead to results enabling the problem to be simplified. Indeed, the three system operating conditions are shown by the following table: (Y = open; X = closed)

| Burner | Valves | | | | | | | |
|---|---|---|---|---|---|---|---|---|
| | A | B | C | E | F | G | H | I |
| Lit | Y | Y | X | X | X | X | X | Y |
| Sdavenging | X | Y | Y | Y | Y | Y | Y | X |
| Extinguished | X | X | Y | Y | Y | Y | X | X |

The above table clearly shows the exact bi-univocal correspondence between the "lit" condition and the two "unlit" conditions, only excepted that valve H is open only at scavenging.

The above correspondence has hence permitted that design be directed to an apparatus which, on receiving a determined signal, would set valves A, B, I at a open condition and valves C, E, F, G at a closed condition and, on receiving an opposite signal, would close valves A, B, I and open valves C, E, F, G.

Such an apparatus which is incomplete as assigning to a single member the control for valves A, B, C, E, F and to two other independent members the control for valves G and I is already known and has been carried out by using plug cocks for valves A, B, C, E, F and solenoid electrovalves for valves G and I.

The terminology "plug intercepting valve" is intended to define a valve in which a piston or plug is moved in a direction generally along the axis of the fluid conduit into contact with the walls to intercept fluid flow as illustrated in the drawing. These valves may, as illustrated, be configured such that fluid pressure acts on the valve to bias the valve into a closed position.

Such an apparatus did not give substantially satisfactory results, particularly owing to difficulties in conciliating for plug cocks such requirements as an absolute sealing and ready operation handiness under the combined effects of high pressure and temperature changes of the fluids being intercepted.

Therefore, it is the object of the present invention to provide a control apparatus capable of fully solving the above problems and removing the disadvantages as shown by known apparatus.

THE DETAILED DESCRIPTION

Figure 3:
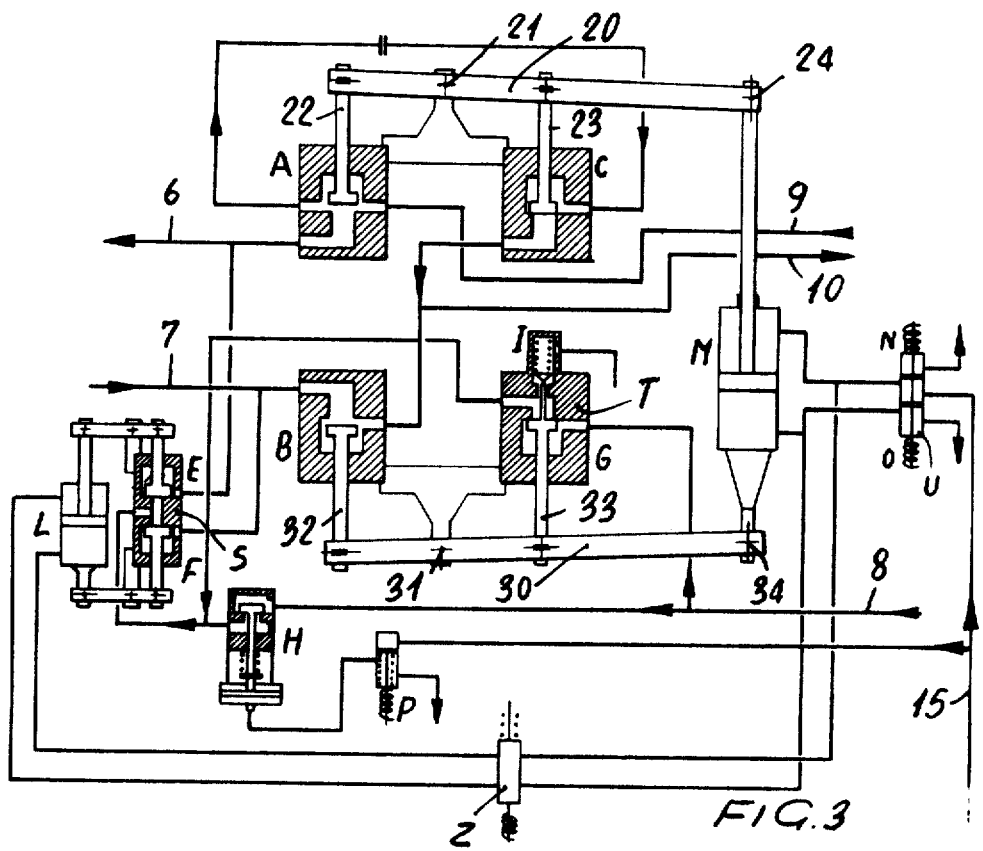
FIG. 3 is a diagram for a first embodiment of the control apparatus according to the present invention.

A first embodiment of the apparatus of the present invention is shown in FIG. 3 (wherein the same numerals of FIG. 2 are used for designating like parts) and particularly comprises:

three plug intercepting valves A, B, C having a simple seating, all of which are so connected that at a closed position the pressure differential between the two intercepted spaces cooperates with the servomotor action to exert the sealing pressure on the seating. These valves perform the functions of valves A, B, C in the diagram of FIG. 2;

two plug valves E and F connected as above, but combined in a single body S. These valves perform the functions of valves E and F in the diagram of FIG. 2;

a special double-seating valve T for performing the functions of valves G and I; in the diagram of FIG. 2;

a pneumatic or hydraulic servomotor (L) for simultaneously actuating valves E and F;

a pneumatic or hydraulic servomotor (M) for simultaneously actuating valves A, B, C, G and I by means of a lever system for operation reversion, as specified in the above, disclosed table;

a pneumatic valve H for burner scavenging (valve H of FIG. 2);

a pneumatic or hydraulic five-way, double-solenoid N—O slide valve U for actuating the two pneumatic or hydraulic servomotors L and M;

a three-way solenoid valve P for actuating valve H;

a four-way solenoid valve Z for control-reversion drive to cylinder L.

It should be noted that pressure fluid supply to valve P and slide valve U is effected through a pipe 15 connected to a suitable pressure fluid source (not shown).

Particularly, the apparatus, is characterized by comprising:
a. a plurality of simple seating plug valves A, B, C wherein at a closed position of such valves the fluid pressure cooperates in exerting the sealing pressure on the seating;
b. two pneumatic or hydraulic servomotors L M, wherein the thrust elements are opposite and released so as to simultaneously exert the sealing stress of two plugs on the two seatings;
c. a special double-seating valve T for performing as a single member those functions which are required from valves G and I of FIG. 2.

The apparatus is further characterized by comprising various lever systems, as connected to a pneumatic or hydraulic servomotor, for simultaneously transmitting the control of this servomotor to the four valves A, B, C and G, respectively for fuel oil delivery, return and recirculation, and for intercepting the cooling steam flow to the burner, exerting the sealing pressure on pairs of two valves for each servomotor position.

In the figure these levers systems are particularly comprised of levers 20 and 30 pivoted about pins 21 and 31, the mutual spacing of which is fixed, the ends of stems 22 and 23 of valves A and C and stems 32, 33 of valves B and G being pivoted thereon on both sides of these pivotings, the ends of said levers being pivoted at 24 and 34, respectively, to both moving ends of servomotor M.

Figure 5:
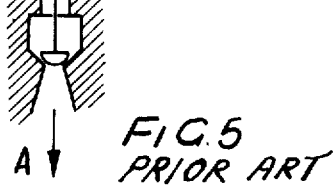
FIGS. 5 and 6 are schematic diagrams of known apparatus.
Figure 6:
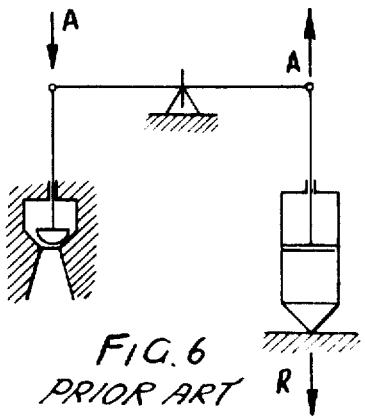

In order that point (b) be more clearly explained, it should be noted that the normal operation of a fluid-servomotor controlled valve is as shown in FIGS. 5 and 6. Action A, as exerted on the piston by the fluid, which in FIG. 5 is a direct action and a return action in FIG. 6, represents the sealing stress. Reaction R, as exerted on the cylinder by the fluid, will operate on valve body in the case of FIG. 5, or on the fixed cylinder support in the case of FIG. 6.

Figure 7:
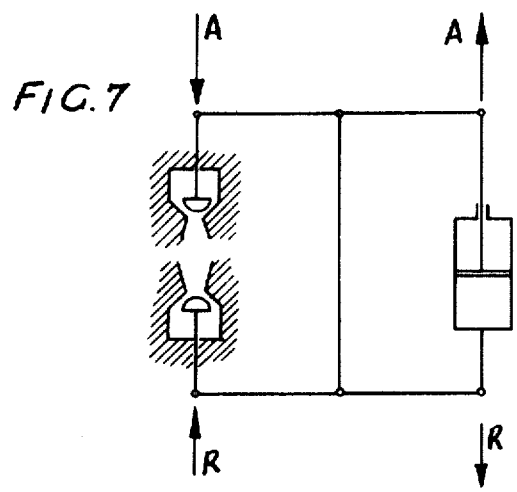
FIG. 7 is a schematic diagram of FIGS. 3 and 4.

In the apparatus described (FIG. 7) said reaction R is instead usefully taken advantage of for the second valve sealing.

The operation for the assembly is clearly shown in FIG. 3. For igniting the burner, solenoid N is energized. to control the position of servomotors L and M to close valves C, E, F, and G and to open valves A, B, and I.

In order to extinguish said burner, solenoid O is energized; as a result servomotor L will "close" and servomotor M will "open." Thus, valves A and B are closed and valves C, E, F, G are open; valve I, as released from its forced open position, will close under the action of its spring 16. For scavenging, immediately following burner extinction, valve H is opened by energizing solenoid valve P for the time being required.

Where system running conditions require burner extinction without scavenging, electrovalve Z is operated which will reverse the control signal to servomotor L. Therefore, under these conditions when solenoid O is energized, both servomotor M and servomotor L will open keeping valves A, B, E, F at a closed condition (unscavenged extinguished burner condition).

The apparatus as described is particularly valuable for its simplicity, providing for simultaneously controlling seven valves by using only two fluid servomotors operated by a single pilot slide valve.

Figure 4:
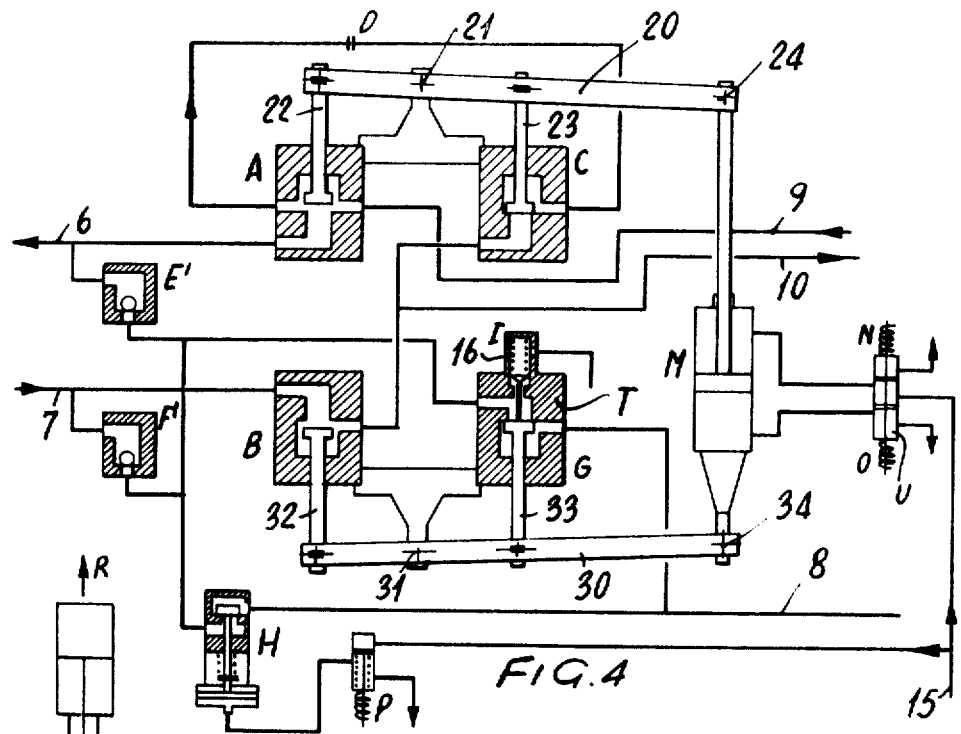
FIG. 4 is a diagram for a second embodiment of the apparatus according to the present invention.

FIG. 4 (wherein the numerals of FIG. 3 are also used) shows a second embodiment of the apparatus according to the invention, which apparatus is further simplified as compared with the embodiment of FIG. 3.

The simplifications being introduced are based on the following considerations:

the pressure prevailing in the burner when valves A and B are closed is the pressure of the combustion chamber, i.e. substantially the atmospheric pressure;

when valve I is open, the atmospheric pressure prevails between valves E,F, G, H and I;

when the burner is "on," the oil pressure varies between about 20 and about 70 Kg./sq. cm;

the steam pressure is of about 10—12 Kg./sq. cm.

Therefore, it can be considered that upstream and downstream of valves E and F the pressures are as set out in the following table:

| Burner | Upstream, kg./sq. cm. | Downstream, kg./sq. cm. | Valves, E-F |
|---|---|---|---|
| On | Atmosphere | 20–70 | Closed. |
| Off | 10–12 | Atmosphere | Open. |

An inspection of upstream and downstream conditions for valves E and F would show that they can be replaced by check valves and availability is as follows:

for closed valve sealing: a pressure differential varying from 20 to 70 Kg./sq. cm;

for initial opening thrust: a pressure differential of 10—12 Kg./sq. cm.

Once the valve has been opened, this initial thrust tends to reduce because of the loss due to steam outflow through the atomizing burner head.

By taking advantage of the above concepts, the approach as shown in FIG. 4 could be carried out, in which approach the servo-controlled valves E and F are replaced by check valves E' and F'.

By comparing FIGS. 3 and 4, it is apparent that in the simplified embodiment of FIG. 4 the fluid servomotor L is omitted and therefore the apparatus comprises a single servomotor (designated by M). Also electrovalve Z is omitted.

However, the more complicated apparatus of FIG. 3 renders it possible, by actuating said electrovalve Z reversing the control to cylinder L, to inhibit scavenging of the burner after extinction; this may be sometimes required by particular emergency situations of the system.

What I claim is:

1. A control apparatus for one burner of a multiple-burner fuel oil burner having an oil delivery pipe, an oil return pipe, an oil-recirculating pipe, and a cooling fluid delivery pipe, said apparatus comprising:

a first plug intercepting valve located in the oil delivery pipe;

a second plug intercepting valve located in the oil return pipe;

a third plug intercepting valve located in the oil-recirculating pipe;

a fourth plug intercepting valve located in the cooling fluid delivery pipe;

a first servomotor operating means for simultaneously controlling said first, second, third and fourth plug intercepting valves so that the opening of said first and second plug intercepting valves is mutually exclusive with the opening of said third and fourth plug intercepting valve, the fluid pressure in said pipes acting on said valves to assist said servomotor in maintaining the closed ones of said plug intercepting valves in a closed position.

2. The control of claim 1 including first and second valve means for respectively controlling the flow of the cooling fluid into the oil delivery and oil return pipes.

3. The control of claim 2 wherein said first and second valve means comprise a double seating valve, the opening of said first and second valve means being mutually exclusive.

4. The control of claim 2 wherein said first and second valve means each comprise one-way valves preventing the flow of oil from the oil delivery and oil return pipes into the cooling fluid pipe.

5. The control of claim 2 wherein said first, second and third valves each have a simple seat on which the oil in the pipes exerts sealing pressure when said valves are in the closed position, and including a second servomotor operable simultaneously with said first servomotor to control the position of said first and second valve means.

6. The control of claim 6 wherein said servomotor includes a piston and cylinder, wherein said first and third plug intercepting valves are operated by a first lever; and wherein said second and fourth plug intercepting valves are operated by a second lever, one of said first and second levers being connected to said piston and the other of said first and second levers being connected to said piston.